United States Patent [19]
Cheng

[11] Patent Number: 6,152,997
[45] Date of Patent: Nov. 28, 2000

[54] WATER/AIR TREATMENT SYSTEM

[76] Inventor: Chen-Chun Cheng, P.O. Box 82-144, Taipei, Taiwan

[21] Appl. No.: 09/239,548

[22] Filed: Jan. 29, 1999

Related U.S. Application Data

[62] Division of application No. 08/547,711, Oct. 20, 1995, Pat. No. 5,971,371.

[51] Int. Cl.⁷ .................................................. B01D 47/00
[52] U.S. Cl. ............................ 96/262; 96/265; 96/326; 96/353; 55/342
[58] Field of Search ............................... 261/76, 77, 103, 261/106, DIG. 22; 96/262, 265, 322, 326, 352, 353, FOR 134, FOR 136; 55/342

[56] References Cited

U.S. PATENT DOCUMENTS

| | | |
|---|---|---|
| 428,307 | 5/1890 | Leland ........................................ 96/353 |
| 441,106 | 11/1890 | Monsanto .................................. 96/322 |
| 1,562,380 | 11/1925 | Stein ......................................... 261/76 |
| 1,912,113 | 5/1933 | Aghnides .................................. 261/76 |
| 2,559,720 | 7/1951 | Hunter ...................................... 96/322 |
| 2,913,232 | 11/1959 | Silverman ................................. 96/326 |
| 3,555,783 | 1/1971 | Grimshaw ................................. 96/353 |
| 3,687,821 | 8/1972 | Zalles ...................................... 261/106 |
| 3,984,504 | 10/1976 | Pick ......................................... 261/76 |
| 5,971,371 | 10/1999 | Cheng ..................................... 261/106 |

*Primary Examiner*—Duane Smith
*Assistant Examiner*—Robert A. Hopkins
*Attorney, Agent, or Firm*—A & J

[57] ABSTRACT

A water/air treatment system consisting of at least one water/air treatment unit, each water/air treatment unit including a water trough, a water pipe having a top end connected to a water source and a bottom end dipped in the water trough, and an expansion pipe suspending in the water pipe, the expansion pipe having a top end connected to a forced air source, a bottom end dipped in the water trough, and a plurality of air holes through the periphery for permitting forced ozone from the forced air source to flow out of the expansion pipe for mixing with water from the water source in water pipe so as to kill microbes and to exchange heat.

6 Claims, 8 Drawing Sheets

WATER/AIR TREATMENT SYSTEM

CROSS-REFERENCE

This application is a division of Ser. No. 08/547,711, filed Oct. 20, 1995, now U.S. Pat. No. 5,971,371.

BACKGROUND OF THE INVENTION

1. Field of the Invention

This invention relates to water/air treatment systems which achieve the functions of (1) purifying air with water, (2) purifying water with forced air, (3) cooling waste hot water and recovering waste heat by using cold air, and (4) cooling waste hot air and recovering waste heat by using cold water.

2. Description of the Prior Art

In recent years, the application of machinery, motor vehicles, pesticides, etc., produces a variety of pollutants which pollute the environment. Various methods have been developed to purify water and air. For example, using wire gauge filter to filter water, using air filter element to filter air, using ozone and oxychloride to kill microbes in water and to remove smells from water and to reduce COD and BOD concentration in water. However, conventional water/air purifying methods are commonly not economic. Furthermore, conventional water/air purifying methods cannot recover waste heat from waste hot water or waste hot air.

SUMMARY OF THE INVENTION

This invention has been accomplished under the circumstances in view. It is the major object of the present invention to provide a water/air treatment system which achieves the functions of (1) purifying air with water, (2) purifying water with forced air, (3) cooling waste hot water and recovering waste heat by using cold air, and (4) cooling waste hot air and recovering waste heat by using cold water. According to one embodiment of the present invention, the water/air treatment system comprises a water trough, a water pipe having a top end connected to a water source and a bottom end dipped in the water trough, and an expansion pipe suspending in the water pipe, the expansion pipe having a top end connected to a forced air source, a bottom end dipped in the water trough, and a plurality of air holes through the periphery for permitting forced ozone from the forced air source to flow out of the expansion pipe for mixing with water from the water source in water pipe to kill microbes and to exchange heat.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

DETAILED DESCRIPTION OF THE PREFERRED EMBODIMENT

For purpose to promoting an understanding of the principles of the invention, reference will now be made to the embodiment illustrated in the drawings. Specific language will be used to describe same. It will, nevertheless, be understood that no limitation of the scope of the invention is thereby intended, such alternations and further modifications in the illustrated device, and such further applications of the principles of the invention as illustrated herein being contemplated as would normally occur to one skilled in the art to which the invention relates.

Figures 1A, 1B, 1C:
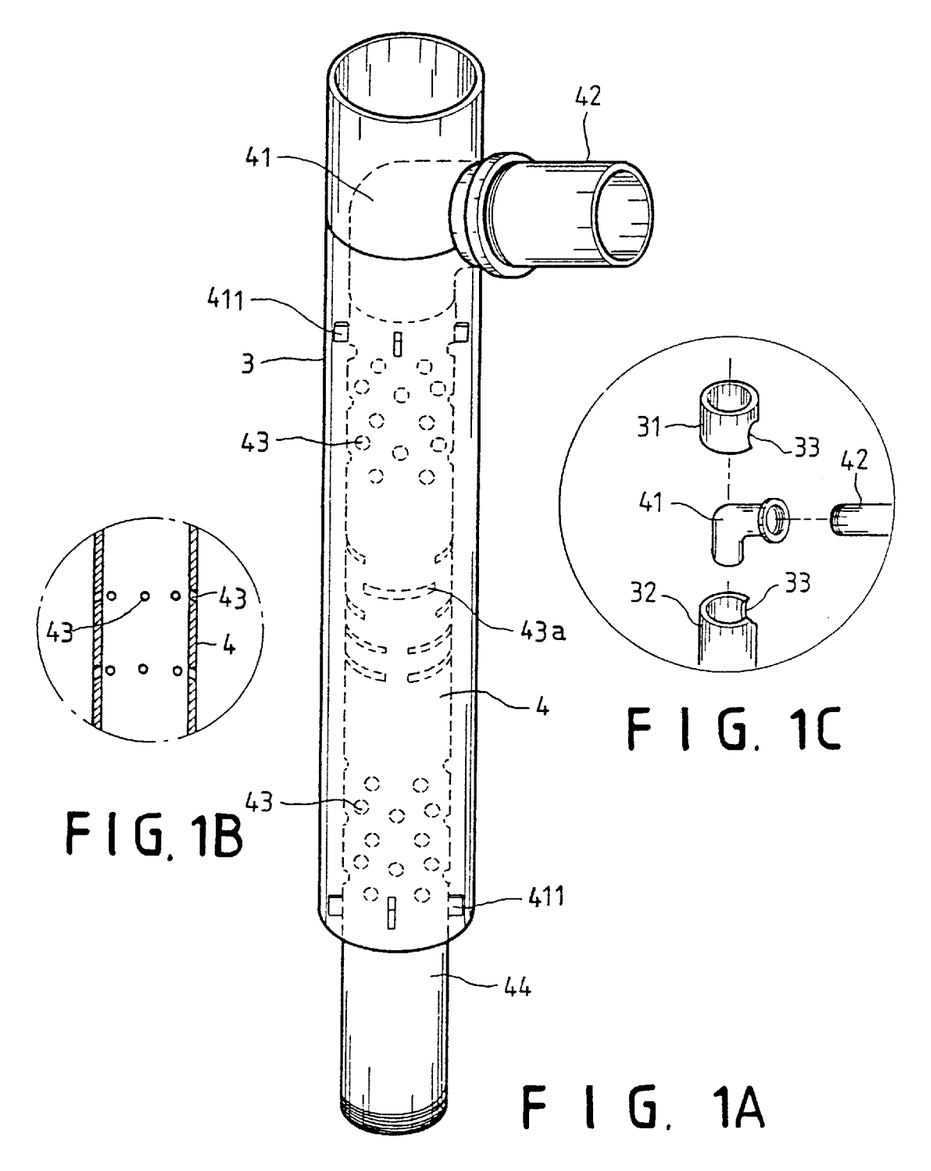
FIG. 1A is a perspective view of a water/air treatment system according to the present invention.
FIG. 1B is a partial view in an enlarged scale of FIG. 1A, showing a plurality of air holes made through the periphery of the expansion pipe.
FIG. 1C is an exploded view of a part of FIG. 1A, showing the position of the bend on the water pipe.

Referring to FIGS. 1A, 1B, and 1C, a water/air treatment system in accordance with the present invention comprises a water pipe 3 and an expansion pipe 4 mounted in the water pipe 3. The water pipe 3 is comprised of an upper section 31 and a lower section 32 welded together. The upper section 31 and the lower section 32 have a respective half-round opening 33 matched with each other (see FIG. 1C). A bend 41 is installed in the half-round openings 33 and retained between the upper section 31 and the lower section 32, having one end connected to an air intake pipe 42 outside the water pipe 3, and an opposite end connected to one end of the expansion pipe 4 inside the water pipe 3 (see FIG. 1C). The expansion pipe 4 is inserted into the water pipe 3 and connected to the bend 41, having a plurality of fins 411 spaced around the periphery at different elevations and stopped against the inside wall of the water pipe 3, a plurality of air holes 43 (or narrow, elongates air slots 43a) through the periphery, and a plain bottom end 44 extended out of the water pipe 3. The fins 411 are designed to space the periphery of the expansion pipe 4 from the inside wall of the water pipe 3 at the desired distance. The air holes 32 are made transversely across the periphery of the expansion pipe 4. Alternatively, the air holes 32 can be made obliquely through the periphery of the expansion pipe 4 (see FIG. 1B).

Figures 2A, 2B:
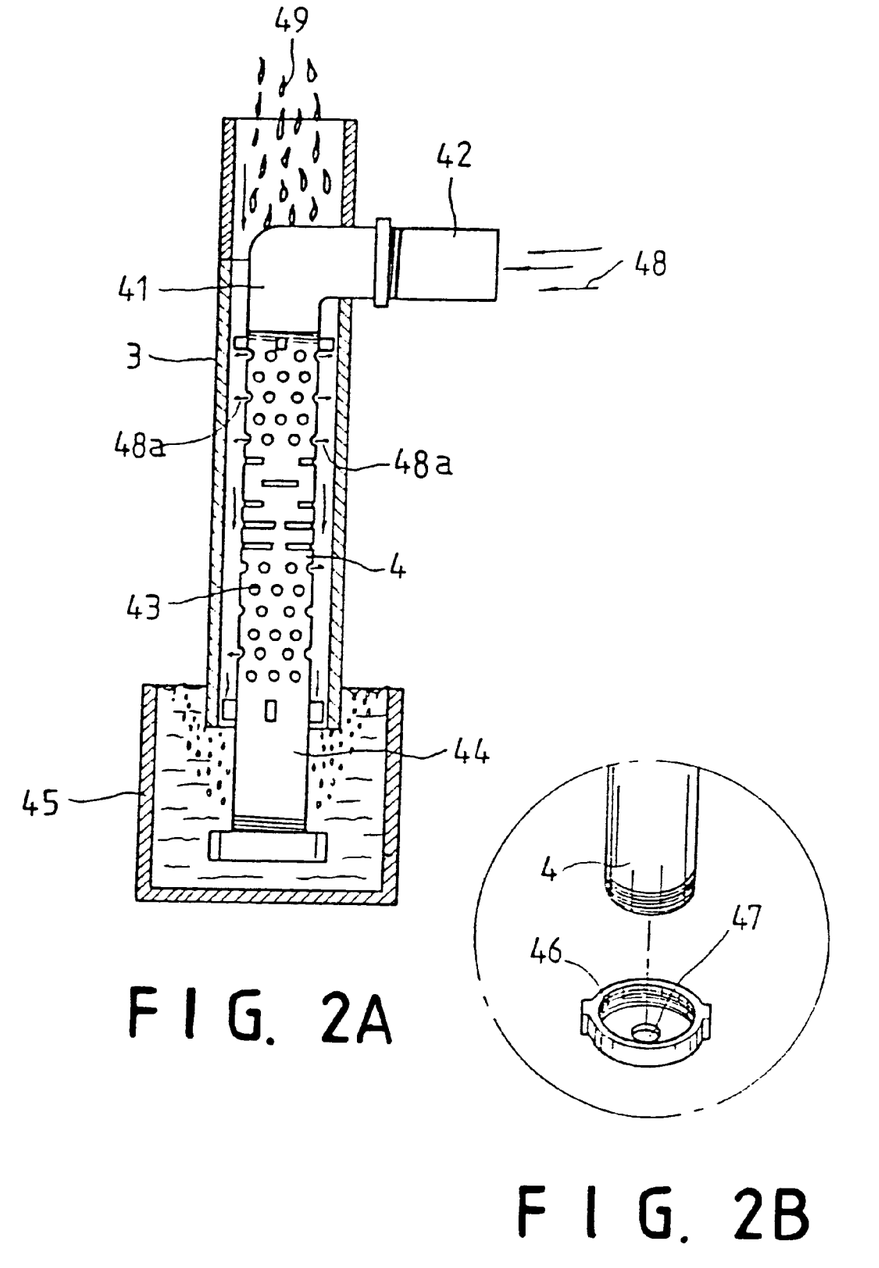
FIG. 2A is a sectional view showing the plain bottom end of the expansion pipe of the water/air treatment system of FIG. 1A dipped in a water trough.
FIG. 2B is an exploded view of a part of FIG. 2A, showing the position of the screw cap on the plain bottom end of the expansion pipe.

Referring to FIGS. 2A and 2B, the plain bottom end 44 of the expansion pipe 4 is covered with a screw cap 46 and dipped in a water trough 45. The screw cap 46 has a center through hole 47 of diameter bigger than that of the air holes 32 for permitting sediment to be expelled out of the expansion pipe 4 into the water trough 45. When water 49 flows through the water pipe 3 into the water trough 45, a flow of air 48 is forced into the expansion pipe 4 through the air intake pipe 42. When the flow of air 48 is forced into the expansion pipe 4, it immediately flows out of the expansion pipe 4 through the air holes 43 (or narrow, elongates air slots 43a). When air molecules 48a of the flow of air 48 pass out of the expansion pipe 4, the downward flow of water 49 cuts through the air molecules 48a of the flow of air 48, causing them dissolved in water.

Figure 3:
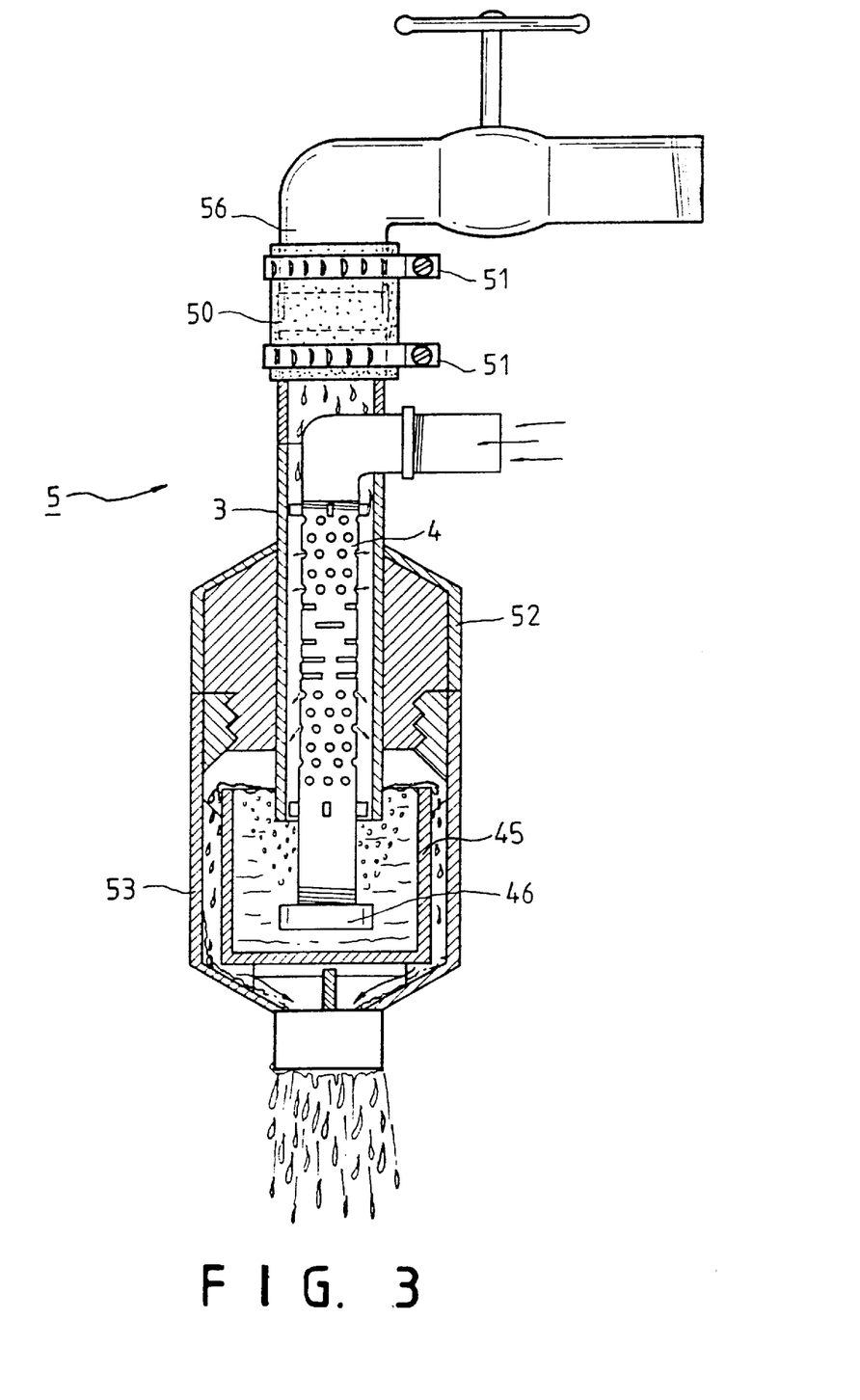
FIG. 3 shows a water purifier made according to the present invention.

FIG. 3 shows an application of the aforesaid water/air treatment system in a small water purifier 5. As illustrated, the water purifier 5 comprises an upper shell 52 and a bottom shell 53 mounted around the water pipe 3 and fixedly connected together. The water pipe 3 has a top end disposed outside the upper shell 52 and coupled with a hose 50, which is fastened to a water tap 56 by clamps 51. The screw cap 46 which is mounted on the bottom end of the expansion pipe 4 is suspended in the water trough 45 inside of the bottom shell 53 of the water purifier 5. When the water tap 56 is opened to let a flow of water flows through the water purifier 5, a flow of oxygen-intensive gas, such as ozone or oxychloride is forced into the expansion pipe 4 to mix with water, and therefore water is purified. This arrangement can effectively kill microbes in water, removes bad smells from water, reduces COD and BOD concentration in water. Therefore, this structure of water purifier is practical for use in kitchens, laboratories, hospitals, public toilets, etc. This arrangement can also be employed for use to purify air.

Figure 4:
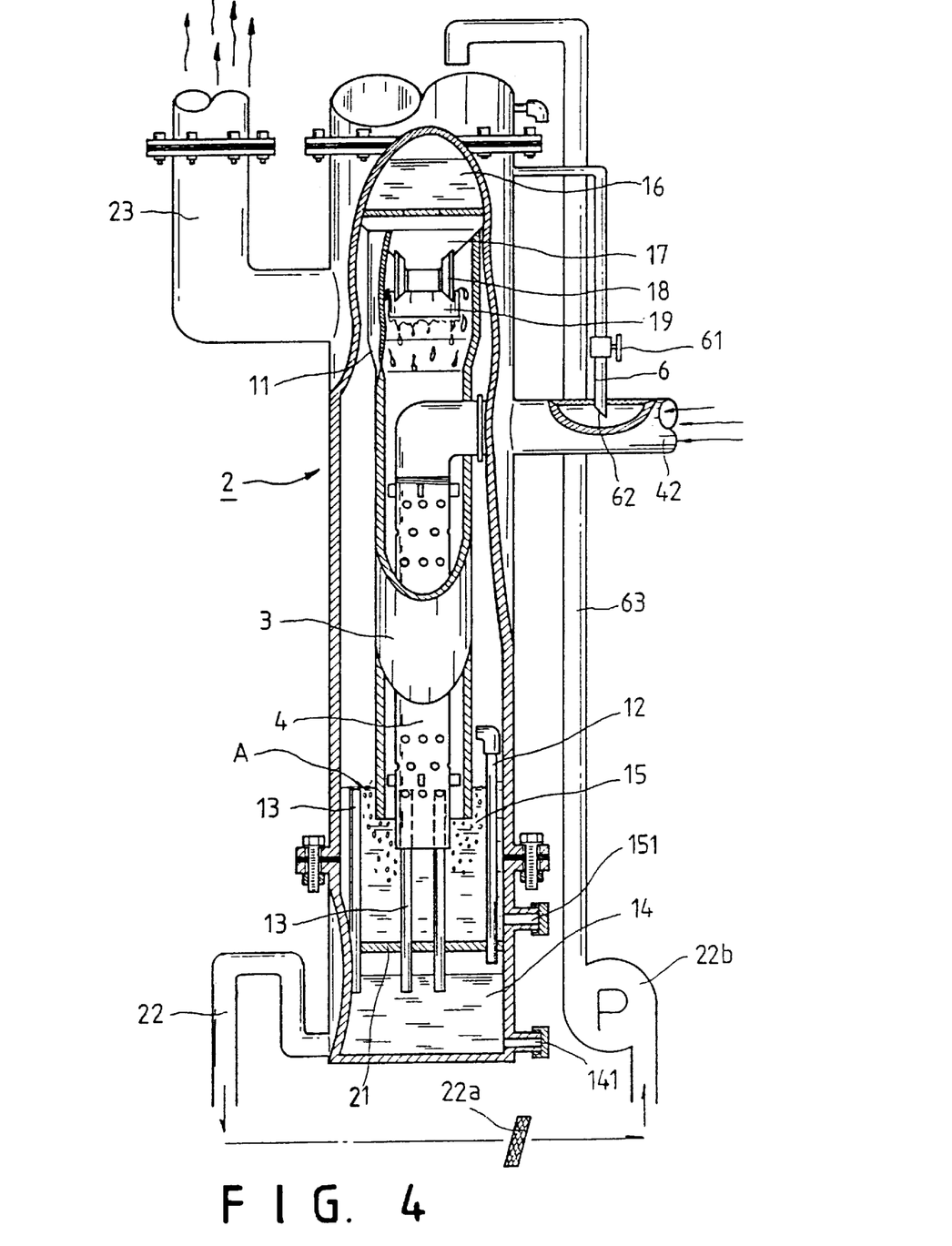
FIG. 4 is a sectional view of a medium scale water/air treatment system according to the present invention.
Figure 5:
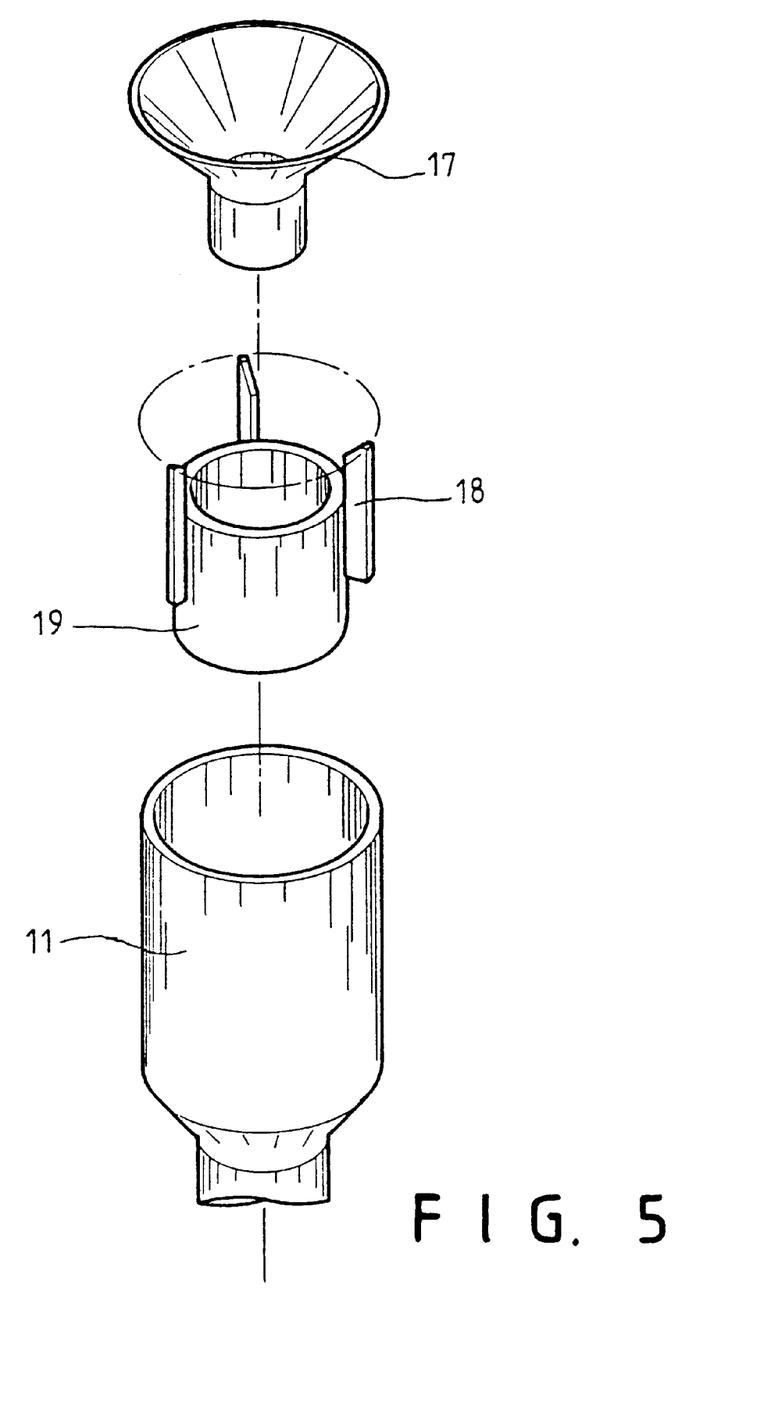
FIG. 5 is an exploded view of a water controller according to the present invention.

FIGS. 4 and 5 show a medium scale water/air treatment system according to the present invention. This water/air treatment system comprises a cylindrical casing 2, a top water trough 16 inside the cylindrical casing 2 at the top, a hopper 17 connected to the bottom end of the top water container 16 to guide water from it to a water container 19 below. The water container 19 has peripheral lugs 18 welded to the periphery of the hopper 17, permitting the reduced bottom end of the hopper 17 to be dipped in the water container 19 at about one third of the depth thereof. A socket 11 is mounted inside the cylindrical casing 2 around the water container 19, having a reduced bottom end connected to a water pipe 3. The hopper 17, the water container 19, and the socket 11 form a water controller, which has a space defined between the socket 11 and the water container 19 for letting overflow of water to pass from the water container 19 into the water pipe 3. The water pipe 3 and the expansion pipe 4, which is installed in the water pipe 3, are suspended inside the cylindrical casing 2 and dipped in an intermediate water trough 15. The intermediate water trough 15 is disposed above a bottom water trough 14. A plurality of overflow pipes 13 are mounted in the partition wall 21 between the bottom water trough 14 and the intermediate water trough 15. The bottom ends of the overflow pipes 13 are respectively dipped in the bottom water trough 14. The top ends of the overflow pipes 13 are disposed at an elevation higher than the bottom end of the water pipe 3 for controlling the level of water A. The total output capacity of the overflow pipes 13 is bigger than the water intake capacity of the water pipe 3. A drain pipe 22 is mounted on the cylindrical casing 2 for guiding water out of the bottom water trough 14. The drain pipe 22 determines the water level of the bottom water trough 14. An air return pipe 12 is installed in the partition wall 21 for guiding air from the bottom water trough 14 to the space inside the cylindrical casing 2 above the intermediate water trough 15. Water from the drain pipe 22 is filtered through a water gauge filter 22a and then pumped to the top water trough 16 through a water return pipe 63 by a water pump 22b. Cleanout plugs 141 and 151 are respectively mounted on the bottom water trough 14 and the intermediate water trough 15. Waste hot air may be guided through the air intake pipe 42 into the expansion pipe 4 for heat exchange with the downward flow of water, which falls from the water container 19 to the intermediate water trough 15 through the water pipe 3. If the downward flow of water from the water container 19 is waste hot water, cold air can be guided into the expansion pipe 4 through the air intake pipe 42 to make heat exchange for waste-heat recovery.

Referring to FIG. 4 again, an exhaust pipe 23 is mounted on the cylindrical casing 2 near the top end for guiding air out of the cylindrical casing 2. The diameter of the exhaust pipe 23 is bigger than that of the air intake pipe 42. A small water guide pipe 6 is provided for guiding water from the top water trough 16 into the air intake pipe 42. A water valve 61 is installed in the small water guide pipe 6 for controlling the flowrate of water passing through. The small water guide pipe 6 has a beveled bottom end 62 suspending in the air intake pipe 42. The cutting edge of the beveled bottom end 62 is disposed reversed to the flowing direction of air passing through the air intake pipe 42. Therefore, water can be conveniently guided out of the small water guide pipe 6 to moisten air passing through the air intake pipe 42.

Figure 6:
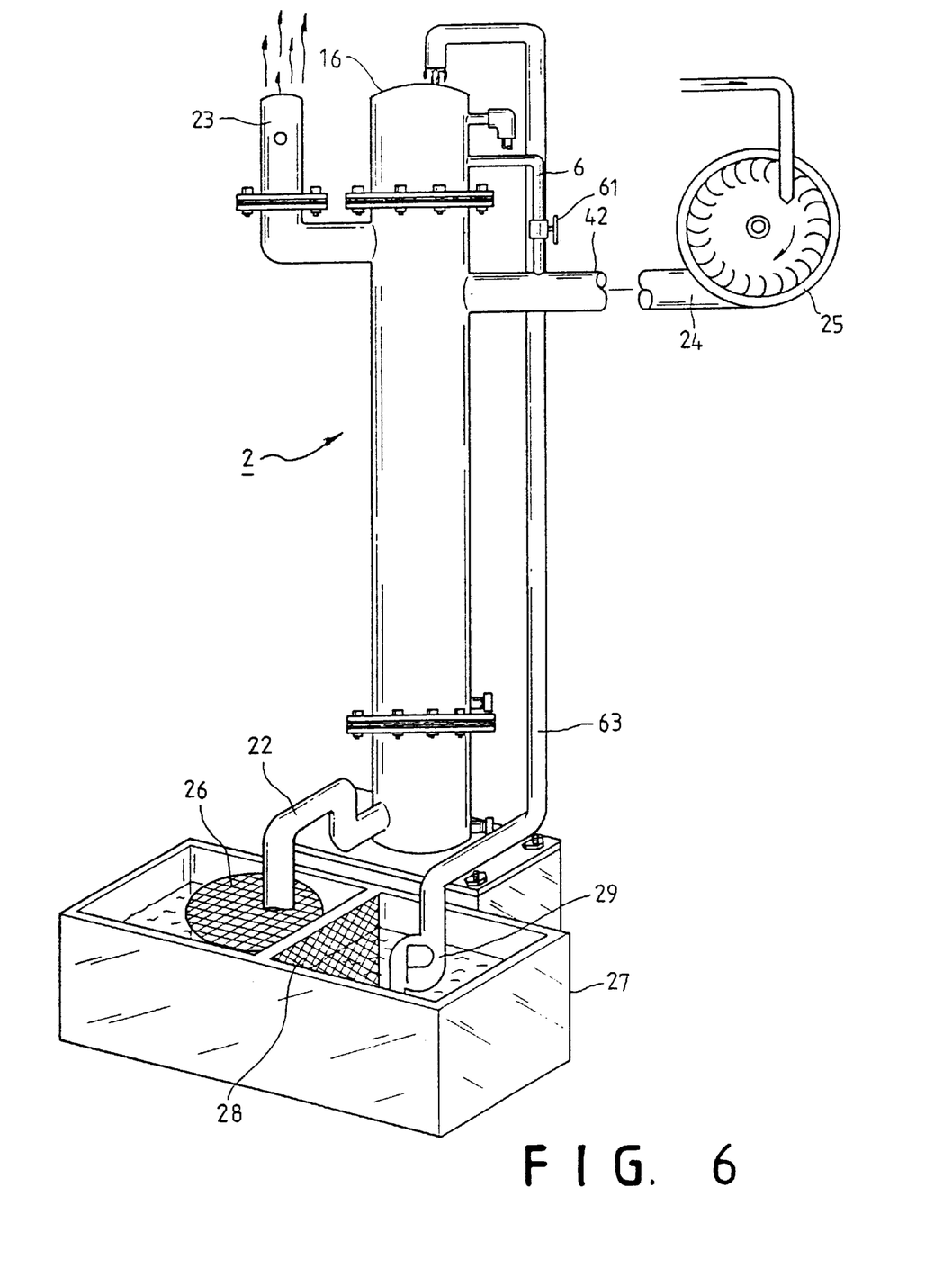
FIG. 6 is an elevational view of the medium scale water/air treatment system shown in FIG. 4.

Referring to FIG. 6, an air blower 25 is controlled to drive currents of air into the air intake pipe 42 through an air guide pipe 24; the drain pipe 22 is connected to a water circulation trough 27 through a first wire gauge filter 26. Water from the drain pipe 22 is then filtered through a second wire gauge filter 26, and then pumped by a water pump 29 into the top water trough 16 through the water return pipe 63.

Figure 7:
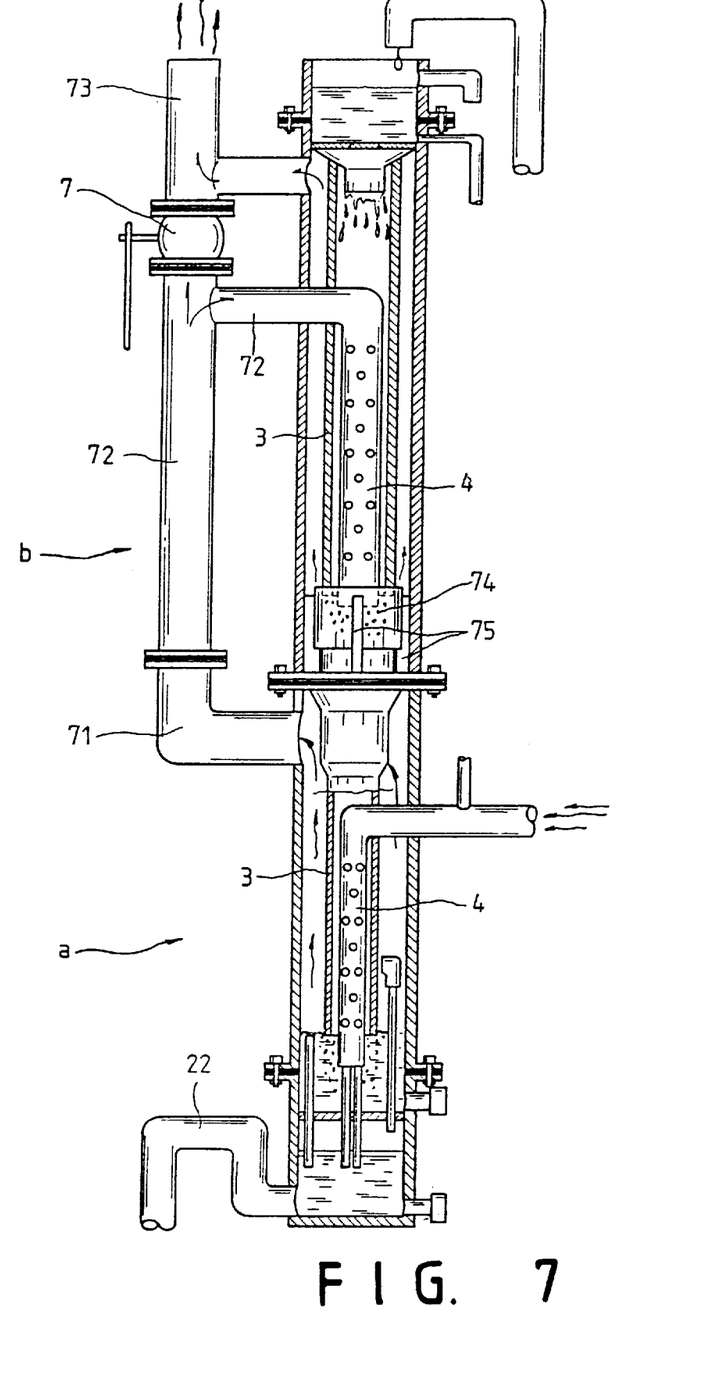
FIG. 7 shows two medium scale water/air treatment systems vertically connected in series according to the present invention.

FIG. 7 shows two medium scale water/air treatment systems a and b vertically connected in series. As illustrated, the exhaust pipe 71 of the first medium scale water/air treatment system a is connected to the air intake pipe 72 of the second medium scale water/air treatment system b; a change valve 7 is connected between the air intake pipe 72 and exhaust pipe 73 of the second medium scale water/air treatment system b; the first medium scale water/air treatment system b eliminates the installation of the aforesaid water controller; the second medium scale water/air treatment system b comprises a water trough 74 plugged onto the bottom end of the water pipe 4 and supported on legs 75. This combined system is suitable for use in factories and incinerators to treat waste water/waste gas.

Figure 8:
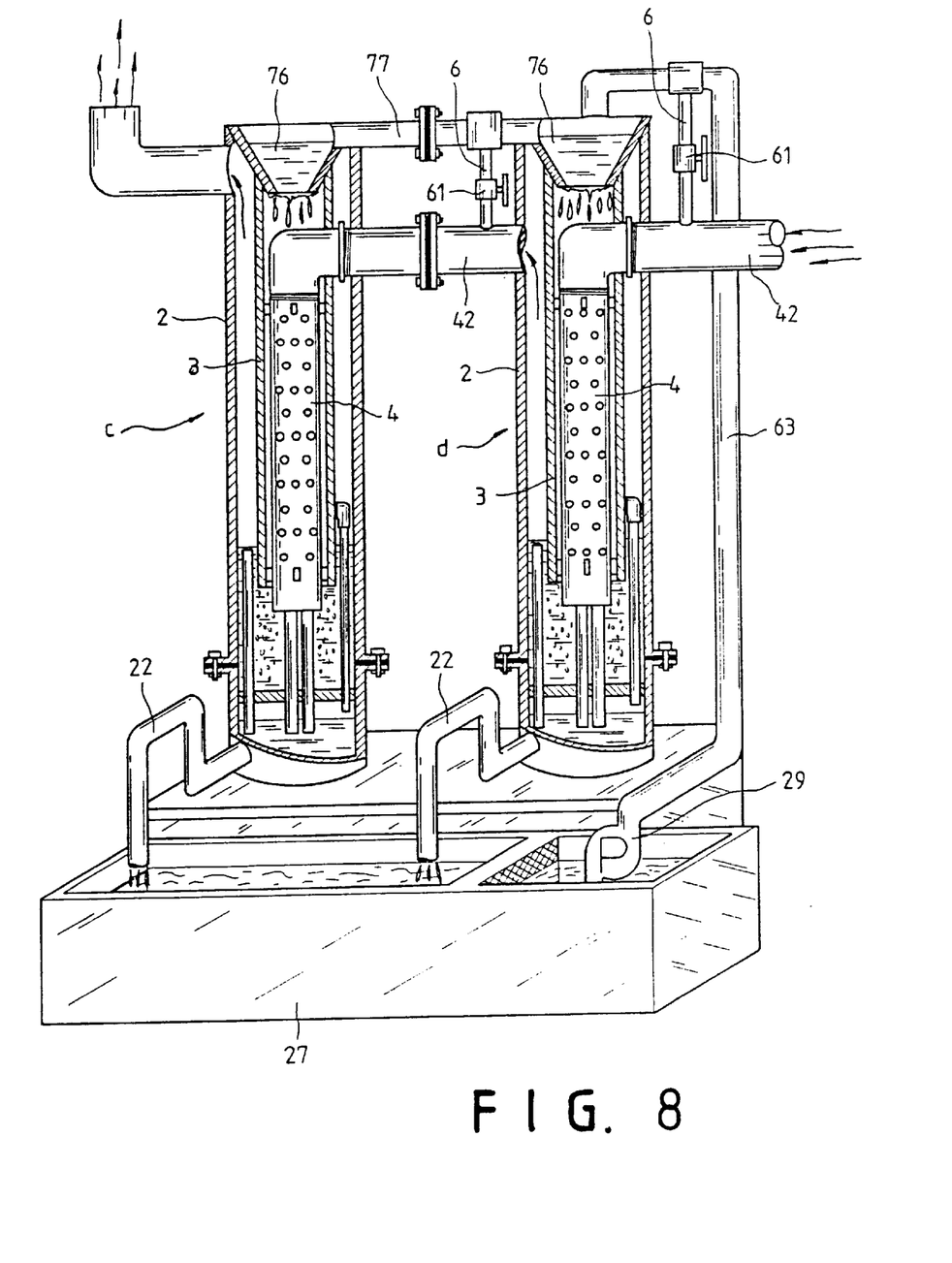
FIG. 8 shows two medium scale water/air treatment systems connected in parallel according to the present invention.

FIG. 8 shows two medium scale water/air treatment systems c and d connected in parallel, in which the top water troughs 76 of the two medium scale water/air treatment systems c and d are connected by a water guide pipe 77. The output capacity of the water pump 29 must be relatively increased so that water can be efficiently pumped from the water circulation trough 27 to the top water troughs 76.

As indicated, the present invention provides different scales of water/air treatment systems for different purposes. Basically, the present invention achieves the following functions:

(1) purifying air with water;
(2) purifying water with forced air;
(3) using cold air to cool waste hot water and to recover waste heat from waste hot water; and
(4) using cold water to cool waste hot air and to recover waste heat from waste hot air.

It is to be understood that various modifications and changes could be made without departing from the spirit and scope of the invention disclosed.

The invention is naturally not limited in any sense to the particular features specified in the forgoing or to the details of the particular embodiment which has been chosen in order to illustrate the invention. Consideration can be given to all kinds of variants of the particular embodiment which has been described by way of example and of its constituent elements without thereby departing from the scope of the invention. This invention accordingly includes all the means constituting technical equivalents of the means described as well as their combinations.

I claim:

1. A water/air treatment system comprising at least one water/air treatment unit for (1) purifying air with water, (2) purifying water with forced air, (3) cooling waste hot water and recovering waste heat by using cold air, and (4) cooling waste hot air and recovering waste heat by using cold water, each water/air treatment unit comprising: a water trough, a water pipe having a top end connected to a water source and a bottom end dipped in said water trough, and an expansion pipe suspending in said water pipe, said expansion pipe having a top end connected to a forced air source, a bottom end dipped in said water trough, and a plurality of air holes through the periphery for permitting forced air from said forced air source to flow out of said expansion pipe for mixing with water from said water source in said water pipe, a housing covered around said water trough and said water pipe, and a hose fixedly secured to the top end of said water pipe for connection to a city water tap.

2. The water/air treatment system of claim 1 wherein said forced air source is an ozone generator.

3. The water/air treatment system of claim 1 wherein each water/air treatment system further comprises an exhaust pipe for exhaust of air.

4. The water/air treatment system of claim 1 wherein each water/air treatment unit further comprises a cylindrical casing covered around said water pipe and said water trough to hold a second water trough at a top end thereof for supplying water to said water pipe and a third water trough at a bottom end thereof below the water trough at the bottom end of said water pipe, said cylindrical casing comprising an exhaust pipe near the top end for exhaust of air, a drain pipe near the bottom end for controlling the level of water in said third water trough for permitting excessive water to be pumped out of said third water trough to said second water trough by a water pump, and a small water guide pipe for guiding water from said second water trough into said air intake pipe, said small water guide pipe being controlled by a water valve and having a beveled bottom end suspending in said air intake pipe, the cutting edge of said beveled bottom end being disposed reversed to the flowing direction of air passing through said air intake pipe.

5. A water/air treatment system comprising at least a first water/air treatment unit and a second water air/treatment unit vertically connected in series, for (1) purifying air with water, (2) purifying water forced air, (3) cooling waste hot water and recovering waste heat by using cold air, and (4) cooling waste hot air and recovering waste heat by using cold water, each water/air treatment unit comprising: a water trough, a water pipe having a top end connected to a water source and bottom end dipped in said water trough, and an expansion pipe suspending in said water pipe, said expansion pipe having a top end connected to a forced air source, a bottom end dipped in said water trough, and a plurality of air holes through the periphery for permitting forced air from said forced air source to flow out of said expansion pipe for mixing with water from said water source in said water pipe, a housing covered around said water trough and said water pipe, a hose fixedly secured to a top end of said water pipe for connection to a city water tap, and an exhaust pipe of said first water/air treatment unit being connected to an air intake pipe of said second water/air treatment unit through a change valve.

6. A water/air treatment system comprising at least a first water/air treatment unit and a second water air/treatment unit connected in parallel, for (1) purifying air with water, (2) purifying water forced air, (3) cooling waste hot water and recovering waste heat by using cold air, and (4) cooling waste hot air and recovering waste heat by using cold water, each water/air treatment unit comprising: a water trough, a water pipe having a top end connected to a water source and bottom end dipped in said water trough, and an expansion pipe suspending in said water pipe, said expansion pipe having a top end connected to a forced air source, a bottom end dipped in said water trough, and a plurality of air holes through the periphery for permitting forced air from said forced air source to flow out of said expansion pipe for mixing with water from said water source in said water pipe, a housing covered around said water trough and said water pipe, and a hose fixedly secured to a top end of said water pipe for connection to a city water tap.

* * * * *